US012015888B2

(12) United States Patent
Uchida et al.

(10) Patent No.: US 12,015,888 B2
(45) Date of Patent: Jun. 18, 2024

(54) ACOUSTIC DEVICE AND VIBRATION DAMPING METHOD

(71) Applicant: Yamaha Corporation, Hamamatsu (JP)

(72) Inventors: Katsuya Uchida, Iwata (JP); Akira Miki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 17/577,727

(22) Filed: Jan. 18, 2022

(65) Prior Publication Data

US 2022/0141563 A1 May 5, 2022

Related U.S. Application Data

(63) Continuation of application No. PCT/JP2020/026846, filed on Jul. 9, 2020.

(30) Foreign Application Priority Data

Jul. 19, 2019 (JP) ................................ 2019-133440

(51) Int. Cl.
*H04R 1/02* (2006.01)
*H04R 1/28* (2006.01)
*H04R 9/04* (2006.01)

(52) U.S. Cl.
CPC ........... *H04R 1/026* (2013.01); *H04R 1/2896* (2013.01); *H04R 9/046* (2013.01); *H04R 2499/13* (2013.01)

(58) Field of Classification Search
CPC ...... H04R 1/026; H04R 1/2896; H04R 9/046; H04R 2499/13
See application file for complete search history.

(56) References Cited

U.S. PATENT DOCUMENTS 5,298,693 A * 3/1994 Heijn .................... A47B 81/06 181/207
5,532,437 A * 7/1996 Simplicean ............ H04R 1/025 181/150
6,058,199 A * 5/2000 Umitsu .................. H04R 1/025 181/151
2006/0231327 A1 10/2006 Stiles
2011/0116650 A1* 5/2011 Umetsu .................. H04R 9/045 381/86
2019/0045285 A1 2/2019 Fukuhara et al.

FOREIGN PATENT DOCUMENTS

JP 2002-232983 A 8/2002
JP 2005-204198 A 7/2005
WO WO 2017/154548 A1 9/2017

OTHER PUBLICATIONS

Japanese-language Office Action issued in Japanese Application No. 2019-133440 dated Mar. 31, 2023 with English translation (eight (8) pages).

(Continued)

*Primary Examiner* — Suhan Ni
(74) *Attorney, Agent, or Firm* — Crowell & Moring LLP

(57) ABSTRACT

An acoustic device includes a speaker unit, a support body, and a vibration damping member. The support body has lower mobility than a member on which the speaker unit is mounted. The vibration damping member is provided between the speaker unit and the support body or between the member on which the speaker unit is mounted and the support body.

14 Claims, 4 Drawing Sheets

(56) References Cited

OTHER PUBLICATIONS

International Search Report (PCT/ISA/210) issued in PCT Application No. PCT/JP2020/026846 dated Sep. 24, 2020 with English translation (five (5) pages).
Japanese-language Written Opinion (PCT/ISA/237) issued in PCT Application No. PCT/JP2020/026846 dated Sep. 24, 2020 with English translation (10 pages).
International Preliminary Report on Patentability (PCT/IB/338 & PCT/IB/373) issued in PCT Application No. PCT/JP2020/026846 dated Feb. 3, 2022 (two (2) pages).
Japanese-language Office Action issued in Japanese Application No. 2019-133440 dated Aug. 7, 2023 with English translation (8 pages).
Chinese-language Office Action issued in Chinese Application No. 202080052023.0 dated Nov. 16, 2023 with English translation (27 pages).
Chinese-language Office Action issued in Chinese Application No. 202080052023.0 dated Apr. 25, 2025 with English translation (18 pages).

* cited by examiner

ACOUSTIC DEVICE AND VIBRATION DAMPING METHOD

CROSS REFERENCE TO RELATED APPLICATION

The present application is a continuation application of International Application No. PCT/JP2020/026846, filed on Jul. 9, 2020, which claims priority to Japanese Patent Application No. 2019-133440, filed on Jul. 19, 2019. The contents of these applications are incorporated herein in their entirety.

BACKGROUND

The following disclosure relates to an acoustic device.

When a speaker unit is driven in an acoustic device using the speaker unit such as a speaker, there is a case where a reaction force of the driving is generated at the speaker unit and vibration is transmitted from the speaker unit to a member on which the speaker unit is mounted due to effect of the reaction force. Such transmission of vibration may cause deterioration in reproduction quality of the speaker.

In a related technique, a vibration proof member is interposed between the speaker unit and a housing case on which the speaker unit is mounted. According to the technique, transmission of vibration between the speaker unit and the housing case is suppressed by the vibration proof member, and vibration generated at the speaker unit and the housing case is reduced.

SUMMARY

In the related technique, a cylindrical speaker that prevents transmission of vibration by causing the vibration proof member to be interposed between the speaker unit and the housing is disclosed. However, there is a case in some acoustic devices where the speaker unit is mounted on a member which is lighter, thinner, and easier to vibrate as compared with the speaker unit. In such acoustic device, there is a problem that it is difficult to effectively damp vibration at the speaker unit and the member even when the vibration proof member is interposed between the speaker unit and the member on which the speaker unit is mounted.

The present disclosure has been made in view of the circumstances explained above, and an object thereof is to provide a technical means capable of effectively damping vibration at the speaker unit and the member when the speaker unit is mounted on the member which is light, thin, and easy to vibrate.

In one aspect of the disclosure, an acoustic device includes a speaker unit, a support body with lower mobility than a member on which the speaker unit is mounted, and a vibration damping member provided between the speaker unit and the support body or between the member on which the speaker unit is mounted and the support body.

In another aspect of the disclosure, a vibration damping method includes providing a vibration damping member between a speaker unit and a support body or between a member on which the speaker unit is mounted and the support body to damp vibration generated at the speaker unit and the member on which the speaker unit is mounted by the vibration damping member. The support body has lower mobility than the member on which the speaker unit is mounted.

In another aspect of the disclosure, an acoustic device includes a speaker unit, a plate-shaped first support body supporting the speaker unit, a second support body including a separated portion provided at a position spaced apart from the plate-shaped first support body, and a vibration damping member provided between the first support body and the separated portion.

The objects, features, advantages, and technical and industrial significance of the present disclosure will be better understood by reading the following detailed description of the embodiments, when considered in connection with the accompanying drawings, in which:

DETAILED DESCRIPTION

Hereinafter, an embodiment of the disclosure will be explained with reference to the drawings.

Figure 1:
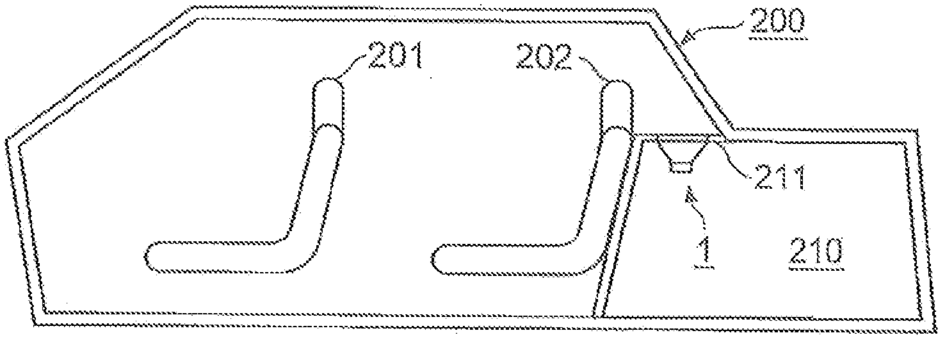
FIG. 1 is a partial cross-sectional view illustrating a configuration example of a vehicle in which an inventive acoustic device is provided.

FIG. 1 is a partial cross-sectional view illustrating a configuration example of a vehicle 200 in which an acoustic device 1 according to an embodiment of the disclosure is provided. The vehicle 200 is a sedan-type vehicle. A front seat 201 and a rear seat 202 are disposed so as to be aligned in a front and rear direction in the vehicle 200, and a luggage space 210 is formed behind the rear seat 202. An upper portion of the luggage space 210 is blocked by a rear tray 211 (a member on which a speaker unit is mounted or an example of a first support body). The rear tray 211 is formed of an approximately rectangular thin-plate material made of light metal such as aluminum for improving fuel consumption of the vehicle 200. The acoustic device 1 according to the embodiment is provided at the rear tray 211.

Figure 2:
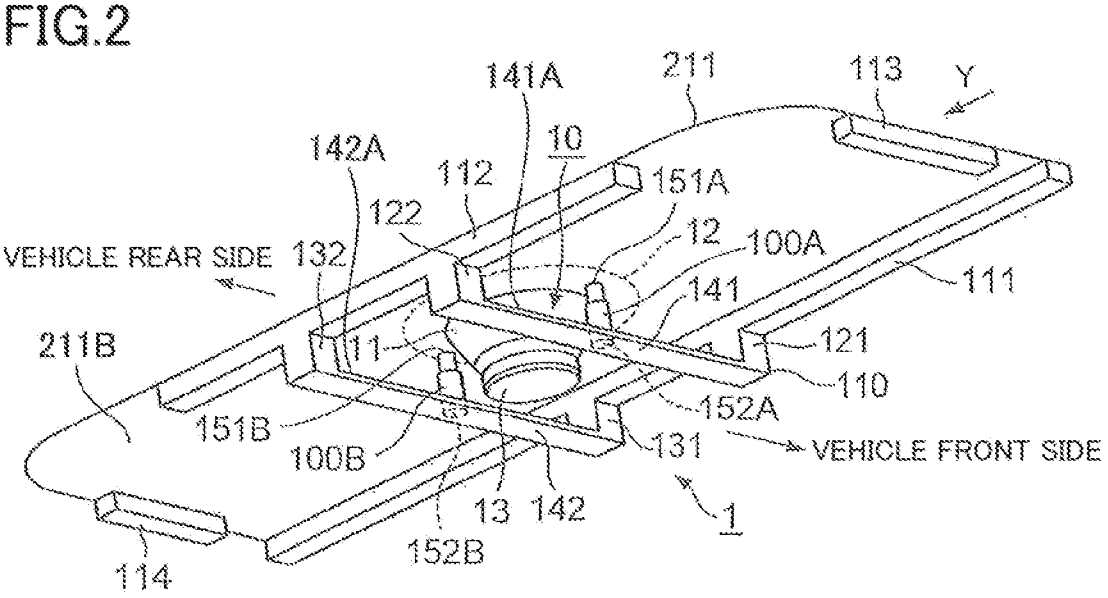
FIG. 2 is a perspective view of a rear tray in which the acoustic device is provided when viewed from diagonally below.
Figure 3:
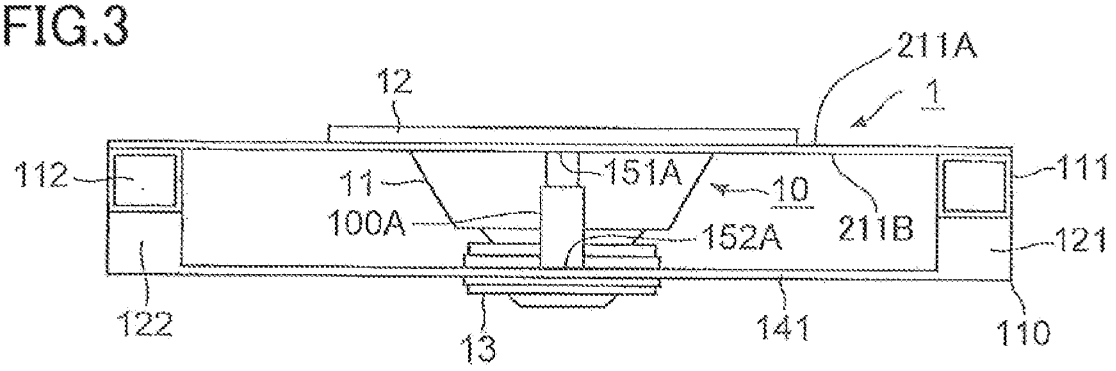
FIG. 3 is a side view of the acoustic device.

FIG. 2 is a perspective view of the rear tray 211 in which the acoustic device 1 is provided when viewed from diagonally below. FIG. 3 is a side view of the acoustic device 1 in a state in which a vehicle-longitudinal-direction reinforcing member 113 of FIG. 2. is removed and viewed from an arrow Y direction.

The acoustic device 1 includes a speaker unit 10 mounted at approximately the center of the rear tray 211. The speaker unit 10 is a woofer having a large diameter, including a cone-shaped portion 11, a flange 12 protruding outward in a radial direction above the cone-shaped portion 11, and a circuit container 13 located below the cone-shaped portion 11. A diaphragm having a voice coil is contained in the cone-shaped portion 11. A magnetic circuit configured to generate magnetic fluxes interlinked with the voice coil is contained in the circuit container 13. The speaker unit 10 is mounted on the rear tray 211 in a state in which the cone-shaped portion 11 is accommodated in a hole provided at approximately the center of the rear tray 211 and the flange 12 is placed on an area around the hole. It is noted that the rear tray 211 includes a surface 211A (an example of a first surface) on a sound emitting surface's side of the speaker unit 10 and a back surface 211B (an example of a second surface) on an opposite side of the first surface, and the flange 12 is mounted on the rear tray 211 in a state in which the flange 12 is in contact with the surface 211A of the rear tray 211.

The heavy speaker unit 10 is mounted at approximately the center of the thin and light rear tray 211 in the embodiment; therefore, vibration is easily generated at the speaker unit 10 and the rear tray 211 when the speaker unit 10 is driven. Accordingly, two places in the rear tray 211 are defined as vibration damping target areas 151A and 151B in the rear tray 211, and vibration damping members 100A and 100B for damping vibration at these vibration damping target areas 151A and 151B are provided for the acoustic device 1 in the embodiment. In the embodiment, two places in the area on which the flange 12 of the speaker unit 10 is placed in the rear tray 211, specifically, two places positioned on both sides in a vehicle width direction in the area on which the flange 12 is placed are defined as the vibration damping target areas 151A and 151B. It is noted that the above described area on which the flange 12 is placed in the rear tray 211 can be a position where the area overlaps the flange 12 in the rear tray 211 when viewed from a sound emitting direction of the speaker unit 10.

The vibration damping members 100A and 100B are bar-shaped members, and respective first ends of the vibration damping members 100A and 100B are fixed to the vibration damping target areas 151A and 151B of the rear tray 211 and the respective second ends of the vibration damping members 100A and 100B are fixed to fixed areas 152A and 152B of a vehicle-length direction members 141 and 142, which will be described below, in which mobility, that is, the degree of easiness of vibration is lower than the rear tray 211. The vibration damping members 100A and 100B are members having the same structure. Therefore, when it is not necessary to distinguish the two, the two are collectively called a vibration damping member 100.

A support body 110 (an example of a second support body) is a member provided with the fixed areas 152A and 152B, and the support body 110 supports the vibration damping member 100. The support body 110 includes a vehicle-width-direction reinforcing member 111 (an example of a second extended portion) with a hollow rectangular pillar shape extending along an edge of the rear tray 211 on a vehicle front side and a vehicle-width-direction reinforcing member 112 (an example of the second extended portion) with a hollow rectangular pillar shape extending along an edge of the rear tray 211 on a vehicle rear side. The vehicle-width direction-reinforcing members 111 and 112 extend in a direction parallel to the back surface 211B of the rear tray 211 and fixed to the back surface 211B. The support body 110 includes a pair of vertical-direction portions 121 and 122 (an example of a first extended portion) respectively protruding downward in a vertical direction from middles of the vehicle-width-direction reinforcing members 111 and 112, and a plate-shaped vehicle-longitudinal-direction member 141 (an example of a separated portion) connecting respective lower ends of these vertical-direction portions 121 and 122. That is, the vertical-direction portions 121 and 122 are respectively supported by the vehicle-width-direction reinforcing members 111 and 112, extending in a direction going away from the back surface 211B of the rear tray 211 and supporting the vehicle-longitudinal-direction member 141 at distal end portions of the vertical-direction portions 121 and 122. The vehicle-width-direction reinforcing members 111 and 112, the vertical direction portions 121 and 122, and the vehicle-longitudinal-direction member 141 are integrally formed as one body in the embodiment. Here, the vehicle-longitudinal-direction member 141 is placed at a position where the vehicle-longitudinal-direction member 141 traverses an area near a right end of the flange 12 in the vehicle width direction, and the fixed area 152A to which an end portion of the vibration damping member 100A is fixed is placed on approximately the center of an upper surface of the vehicle-longitudinal-direction member 141 in the front and rear direction. The vehicle-longitudinal-direction member 141 is disposed such that the vehicle-longitudinal-direction member 141 is spaced apart from the back surface 211B of the rear tray 211 by a predetermined distance in the vertical direction, and the fixed area 152A is provided on an opposed surface 141A opposed to the back surface 211B of the rear tray 211. Therefore, the vibration damping member 100A is disposed between the back surface 211B of the rear tray 211 and the opposed surface 141A of the vehicle-longitudinal-direction member 141. Accordingly, the vibration damping member 100A includes an contact portion (an example of a first contact portion) being in contact with the back surface 211B of the rear tray 211 and a contact portion (an example of a second contact portion) being in contact with the opposed surface 141A of the vehicle-longitudinal-direction member 141. The support body 110 further includes a pair of vertical-direction portions 131 and 132 respectively protruding downward in the vertical direction at middles of the vehicle-width-direction reinforcing members 111 and 112 at respective positions moving from the vertical-direction portions 121 and 122 to the right side in the vehicle width direction, and a vehicle-longitudinal-direction member 142 (an example of a separated portion) connecting respective lower ends of these vertical-direction portions 131 and 132. That is, the vertical-direction portions 131 and 132 are respectively supported by the vehicle-width-direction reinforcing members 111 and 112, extending in a direction going away from the back surface 211B of the rear tray 211, and supporting the vehicle-longitudinal-direction member 142 by distal end portions of the vertical-direction portions 131 and 132. The vehicle-width-direction reinforcing members 111 and 112, the vertical-direction portions 131 and 132, and the vehicle-longitudinal-direction member 142 are integrally formed as one body in the embodiment. Here, the vehicle-longitudinal-direction member 142 is placed at a position where the vehicle-longitudinal-direction member 142 traverses an area near a left end of the flange 12 in the vehicle width direction, and the fixed area 152B to which an end portion of the vibration damping member 100B is fixed is placed on approximately the center of an upper surface of the vehicle-longitudinal-direction member 142 in the front and rear direction. The vehicle-longitudinal-direction member 142 is disposed such that the vehicle-longitudinal-direction member 142 is spaced apart from the back surface 211B of the rear tray 211 by a predetermined distance in the vertical direction, and the fixed area 152B is provided on an opposed surface 142A opposed to the back surface 211B of the rear tray 211. Therefore, the vibration damping member 100B is disposed between the back surface 211B of the rear tray 211 and the opposed surface 142A of the vehicle-longitudinal-direction member 142. Accordingly, the vibration damping member 100B includes an contact portion (an example of a first contact portion) being in contact with the back surface 211B of the rear tray 211 and a contact portion (an example of a second contact portion) being in contact with the opposed surface 142A of the vehicle-longitudinal-direction member 142. The above description is the configuration of the support portion 110.

The acoustic device 1 further includes the bar-shaped vehicle-longitudinal-direction reinforcing member 113 extending along an edge of the rear tray on the right side, and a bar-shaped vehicle-longitudinal-direction reinforcing member 114 extending along an edge of the rear tray 211 on the left side.

The vehicle-width-direction reinforcing members 111, 112 and the vehicle-longitudinal-direction reinforcing members 113, 114 serve to increase rigidity at areas to which these members are fixed in the rear tray 211. The support body 110 including the fixed areas 152A and 152B have high rigidity in the embodiment. The vehicle-width-direction reinforcing members 111 and 112 of the support body 110 increase the rigidity at areas in the rear tray 211 to which the vehicle-width-direction reinforcing members 111 and 112 are fixed. Therefore, the support body 110 has lower mobility than the rear tray 211, and the fixed areas 152A and 152B are areas having lower mobility than the vibration damping target areas 151A and 151B. When the support body 110 and the rear tray 211 are regarded as a vibration body being vibrated based on the driving of the speaker unit 10, the degree of mobility in the vibration body indicates the degree of easiness of vibration in the vibration body based on the driving of the speaker unit 10. Accordingly, the degree of easiness of vibration in the fixed areas 152A and 152B which are areas on which the vibration damping members 100A and 100B are mounted in the support body 110 is lower than the degree of easiness of vibration in the vibration damping target areas 151A and 151B which are areas on which the vibration damping members 100A and 100B are mounted in the rear tray 211. That is, the degree of easiness of vibration based on the driving of the speaker unit 10 at the fixed areas 152A and 152B is lower than the degree of easiness of vibration based on the driving of the speaker unit 10 at the vibration damping target areas 151A and 151B.

The vibration damping target areas 151A and 151B are not limited to two places in the area on which the flange 12 is placed in the rear tray 211. That is, the vibration damping target areas 151A and 151B may be placed out of the area on which the flange 12 is placed in the rear tray 211 as long as respective first ends of the vibration damping members 100A and 100B are mounted in the areas, where the degree of easiness of vibration based on the driving of the speaker unit 10 at the vibration damping target areas 151A and 151B is higher than that in the fixed areas 152A and 152B.

Figure 4:
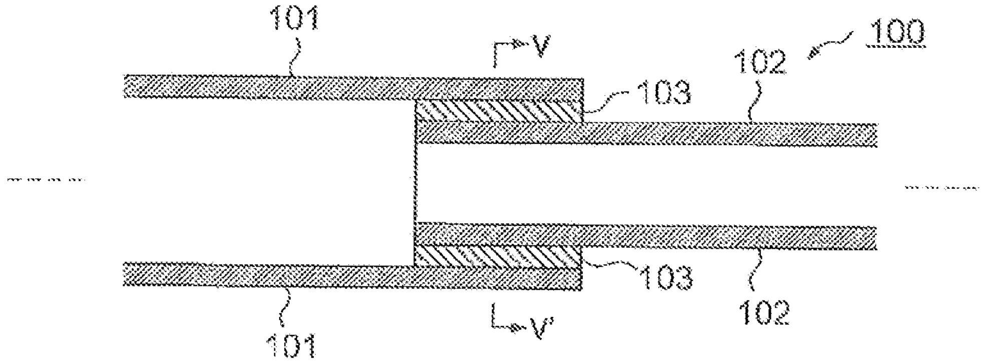
FIG. 4 is a cross-sectional view illustrating a configuration obtained by cutting a vibration proof member in the acoustic device by a plane including a central axis thereof.
Figure 5:
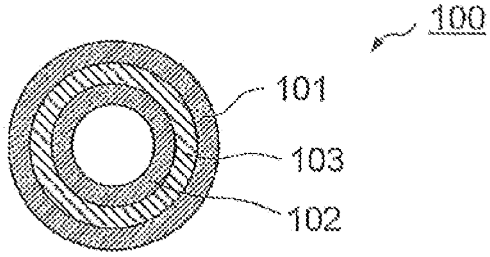
FIG. 5 is a cross-sectional view taken along V-V' line of FIG. 4.

Next, the vibration damping member 100 will be explained. FIG. 4 is a cross-sectional view obtained by cutting the vibration damping member 100 by a plane including a central axis of the vibration damping member 100. FIG. 5 is a cross-sectional view taken along V-V' line of FIG. 4. The vibration damping member 100 includes a first member 101, a second member 102, and a third member 103. In an illustrated example, the first member 101 has a hollow cylindrical shape. The second member 102 has a central axis common to the first member 101 and has a cylindrical shape with an outer diameter shorter than an inner diameter of the first member 101, in which a portion near a first end is inserted into a hollow area of the first member 101. Then, an end portion of the second member 102 on an opposite side of the first member 101 is in contact with the vibration damping target area, and an end portion of the first member 101 on an opposite side of the second member 102 is in contact with the fixed area. The third member 103 has a cylindrical shape filling a gap at a portion where the second member 102 is inserted into the first member 101. An inner wall of the third member 103 is bonded to an outer wall of the second member 102 by an adhesive, and an outer wall of the third member 103 is bonded to an inner wall of the first member 101 by the adhesive. The fixing of the third member 103 is not limited to the fixing by the adhesive but the third member 103 may be fixed by pressure generated by deformation of the third member 103. The first member 101 and the second member 102 are connected to each other through the third member 103 as described above, which forms an approximately bar shape as a whole. The first member 101 and the second member 102 include a first facing area and a second facing area facing each other, namely, an inner wall surface (first facing area) where the first member 101 receives the second member 102 and an outer wall surface (second facing area) where the second member 102 is inserted into the first member 101, and the third member 103 having the cylindrical shape is disposed at the gap between the first facing area and the second facing area.

In the embodiment, the third member 103 is shear-deformed by a force applied between the vibration damping target area and the fixed area, and vibration energy is absorbed by the third member 103, thereby dampening vibration at the vibration damping target area.

It is necessary that the first member 101 and the second member 102 transmit the force applied between the vibration damping target area and the fixed area to the third member 103. The first member 101 and the second member 102 are thus required to be made of a material with a higher elastic modulus than at least the third member 103, which are ideally rigid bodies. In the embodiment, the first member 101 and the second member 102 are formed of metal such as aluminum with high rigidity. The third member 103 is shear-deformed by the force applied through the first member 101 and the second member 102, which requires elasticity to return to an original shape and sufficient viscosity for absorbing vibration energy. Accordingly, a viscoelastic body having viscosity and elasticity such as rubber is used as the third member 103. The viscoelastic body used for the third member 103 may be selected suitably according to a frequency band in which vibration is desired to be absorbed.

According to the present embodiment, when electric current flows in the voice coil in the speaker unit 10 and the diaphragm in the speaker unit 10 vibrates, a reaction force of the driving is given to the magnetic circuit in the speaker unit 10. As a result, interaction between the speaker unit 10 and the rear tray 211 on which the speaker unit 10 is mounted is generated, and vibration is generated in the speaker unit 10 and the rear tray 211. However, the vibration generated in the speaker unit 10 and the rear tray 211 is damped by the vibration damping members 100A and 100B respectively provided between the vibration damping target areas 151A and 151B provided in the rear tray 211 and the fixed areas 152A and 152B of the support body 110 with lower mobility than the rear tray 211 in the present embodiment. That is, the vibration damping member 100 allows variation in distance between the rear tray 211 and the vehicle-length-direction members 141 and 142 while being in contact with the rear tray 211 and the vehicle-length-direction members 141 and 142 of the support body 110 in the state where the speaker unit 10 is driven, thereby damping vibration in the rear tray 211. Therefore, vibration in the speaker unit 10 and the rear tray 211 can be effectively damped even when the speaker unit 10 is mounted on the rear tray 211 which is lighter, thinner and easier to vibrate than the speaker unit 10 according to the present embodiment.

The inventors of the present application attached an acceleration pickup at a position near the speaker unit 10 in the rear tray 211 and installed a microphone near a headrest of the front seat of the vehicle 200 to measure vibration characteristics in a state in which the speaker unit 10 was driven for both cases of having or not having the vibration damping members 100A and 100B for effect confirmation of the present embodiment.

Figure 6:
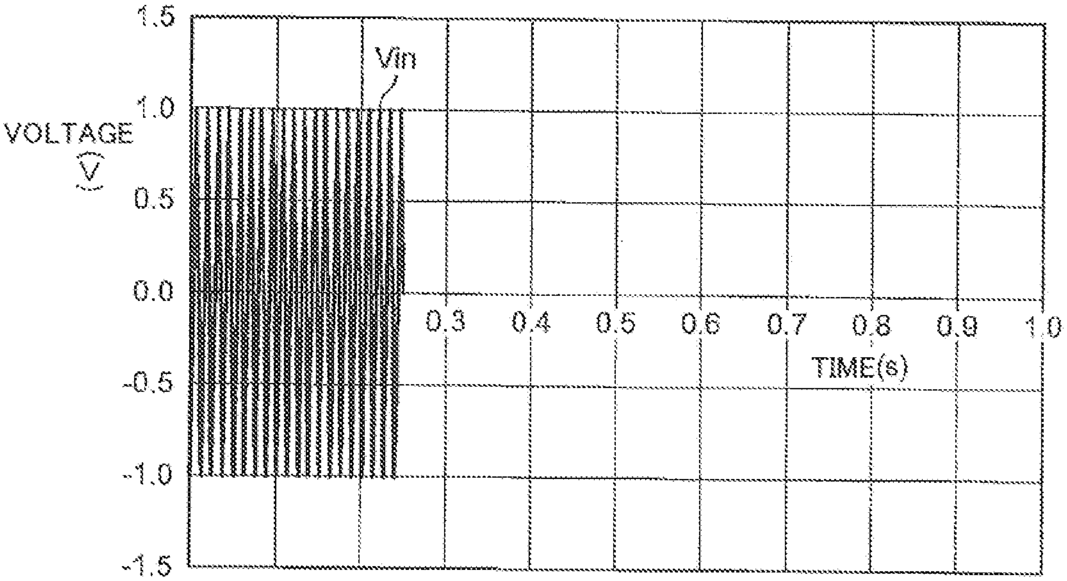
FIG. 6 is a graph illustrating a waveform of a signal inputted to a speaker unit for evaluating characteristics of the same acoustic device.

FIG. 6 is a waveform chart illustrating a waveform of an input signal Vin given to the voice coil of the speaker unit 10. In FIG. 6, a horizontal axis represents time (s) and a vertical axis represents voltage (V). As illustrated in FIG. 6, a tone burst constituted by sine waves of 20 waves with an amplitude of ±1.0V was inputted to the voice coil as the input signal Vin in the measurement of vibration characteristics.

Figure 7:
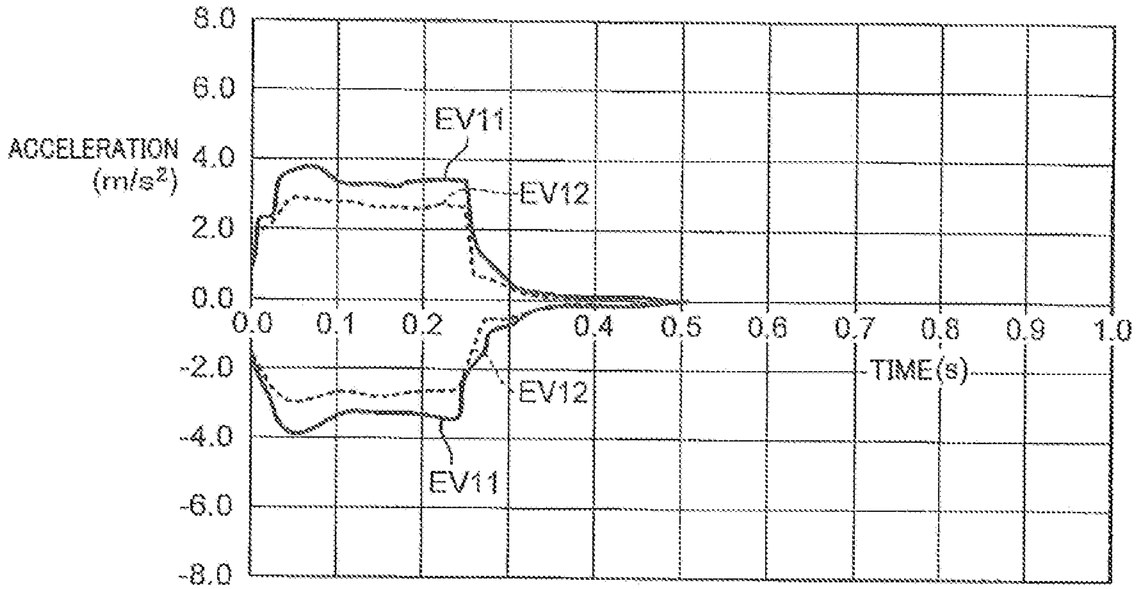
FIG. 7 is a graph illustrating envelopes of acceleration signal waveforms obtained at a position near the speaker unit in the rear tray in respective cases where the acoustic device and an acoustic device according to a comparison example are used.

FIG. 7 is a waveform chart illustrating an envelope EV11 of an acceleration signal waveform obtained by the acceleration pickup in a state in which the vibration damping members 100A and 100B are not provided and an envelope EV12 of an acceleration signal waveform obtained by the acceleration pickup in a state in which the vibration damping members 100A and 100B are provided. In FIG. 7, a horizontal axis represents time (s) and a vertical axis represents acceleration ($m/s^2$).

Figure 8:
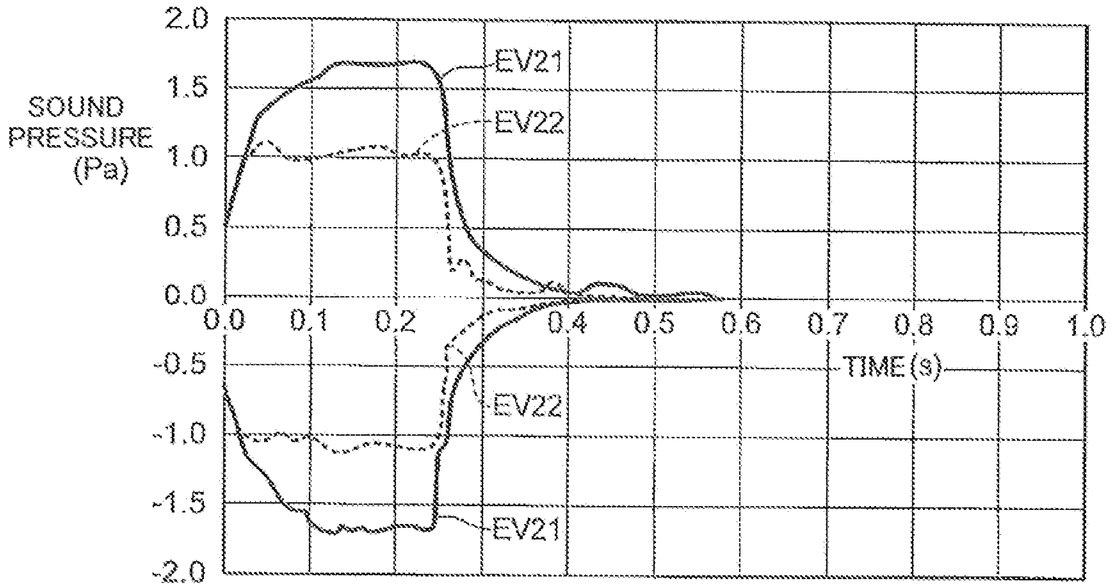
FIG. 8 is a graph illustrating envelopes of sound pressure waveforms obtained at a position near a headrest of a front seat in respective cases where the acoustic device and an acoustic device according to a comparison example are used.

FIG. 8 is a waveform chart illustrating an envelope EV21 of a sound pressure waveform obtained by the microphone in the state in which the vibration damping members 100A and 100B are not provided and an envelope EV22 of a sound pressure waveform obtained by the microphone in the state in which the vibration damping members 100A and 100B are provided. In FIG. 8, a horizontal axis represents time (s) and a vertical axis represents sound pressure (Pa).

Referring to FIG. 7 and FIG. 8, it is found that the acceleration generated at the rear tray 211 and an absolute value of sound pressure obtained by the microphone are reduced when the vibration damping members 100A and 100B are provided. It is also found that the acceleration generated at the rear tray 211 and the sound pressure obtained by the microphone fall immediately in accordance with falling of the input signal with respect to the voice coil when the vibration damping members 100A and 100B are provided. As described above, it is possible to effectively damp vibration in the speaker unit 10 and the rear tray 211 when the speaker unit 10 is mounted on the rear tray 211 which is lighter, thinner, and easier to vibrate than the speaker unit 10 according to the present embodiment.

The embodiment of the disclosure has been explained above, and other embodiments can be considered for the disclosure. They are, for example, as follows.

(1) The number of vibration damping members and positions where the vibration damping members are disposed are not limited to those in the above embodiment. In the rear tray, one or a plurality of areas easy to vibrate may be selected as vibration damping target areas, and vibration damping members for damping vibration at the vibration damping target areas may be provided. The vibration damping target areas are provided at two places sandwiching a mounting area of the speaker unit (the hole accommodating the cone-shaped portion) at the rear tray 211 in the above embodiment. However, the vibration damping target areas may be provided at positions three of more places surrounding the mounting area of the speaker unit. Moreover, the vibration damping target area may be divided into a plurality of areas and may be continuous one area. Although the vibration damping target areas are provided at the rear tray 211 on which the speaker unit is mounted in the above embodiment, the vibration damping target areas may be provided at the speaker unit.

(2) The vibration damping member may be fixed to the vibration damping target area and the fixed area by an adhesive or the like or may merely be brought into contact with each other. Moreover, the vibration damping member may be fixed to one of the vibration damping target area and the fixed area, and the vibration damping member may merely be brought into contact with the other of the vibration damping target area and the fixed area.

(3) The support body 110 is fixed to the rear tray 211 in the above embodiment; however, the support body 110 may be fixed to a member other than the rear tray in the vehicle 200. When the member to which the support body 110 is fixed is a member with high rigidity, the vehicle-width-direction reinforcing members 111 and 112 in the support body 110 may be omitted. When there exists a member with higher rigidity than the rear tray 211 near the rear tray 211 or the speaker unit 10 located inside the vehicle 200, the fixed area to which the vibration damping member is fixed may be provided at the member with high rigidity without providing the support body 110.

(4) The present disclosure is applied to the speaker unit 10 to be mounted on the rear tray 211 in the above embodiment; however, the scope of the disclosure is not limited to this. The disclosure is effective in a case where the speaker unit is mounted on an arbitrary member located inside the vehicle, specifically, a member which is light, thin, and easy to vibrate.

Figure 9:
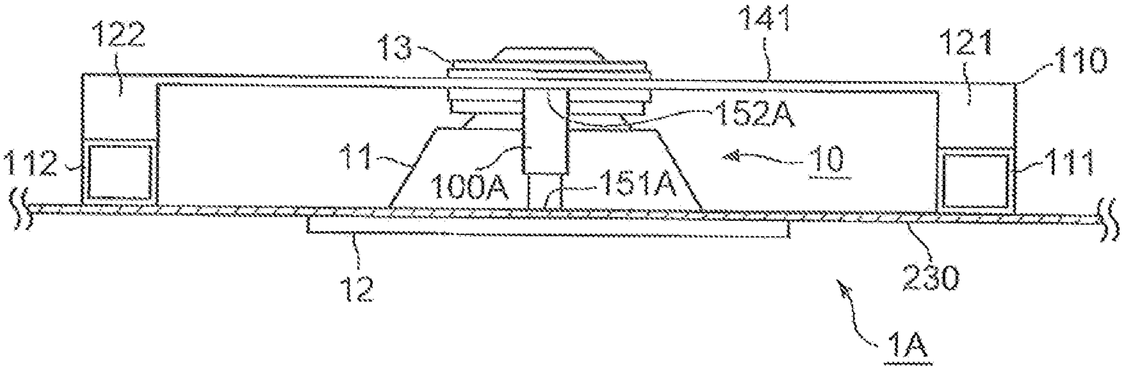
FIG. 9 is a partial cross-sectional view illustrating a configuration of an inventive acoustic device.

(5) The scope of the disclosure is not limited to an on-vehicle acoustic device. The disclosure is effective in a case where the speaker unit is mounted on an arbitrary member which is light, thin, and easy to vibrate. FIG. 9 is a partial cross-sectional view illustrating a configuration of an acoustic device 1A according to an embodiment of the disclosure. In FIG. 9, common symbols are used for components corresponding to respective parts in FIG. 3 illustrated above, and explanation thereof is omitted.

The acoustic device 1A is mounted on a ceiling wall 230 in a state in which the sound emitting surface faces downward. The support body 110 is on a back side (upper side) of the ceiling wall 230, and provides the fixed areas 152A and 152B (not illustrated in FIG. 9) to the vibration damping members 100A and 100B (not illustrated in FIG. 9). In this embodiment, the ceiling wall 230 is light, thin and easy to vibrate. However, the vibration damping members 100A and 100B are provided between the vibration damping target areas 151A, 151B included in the ceiling wall 230 and the fixed areas 152A, 152B of the support body 110 with lower mobility than the ceiling wall 230 in the acoustic device 1A. Accordingly, vibration generated at the speaker unit 10 and the ceiling wall 230 is damped by the vibration damping members 100A and 100B. Accordingly, the same effects as the above embodiment can be achieved in the embodiment.

(6) The speaker unit having the voice coil is used for the acoustic device in the above embodiment: however, the kind of the speaker unit is not limited to this. The disclosure can be applied to various kinds of speaker units.

What is claimed is:

1. An acoustic device, comprising:
a speaker unit;
a support body with lower mobility than a member on which the speaker unit is mounted; and
a vibration damping member provided between the speaker unit and the support body or between the member on which the speaker unit is mounted and the support body, wherein
a flange of the speaker unit is in contact with a surface of the member on which the speaker unit is mounted, and
the vibration damping member is provided at a position at which the vibration damping member overlaps the flange when viewed from a sound emitting direction of the speaker unit.

2. The acoustic device according to claim 1,
wherein the vibration damping member is provided at a vibration damping target area in the member on which the speaker unit is mounted, mobility of the vibration damping target area being higher than the support body.

3. The acoustic device according to claim 1, wherein
a degree of mobility in a vibration body as the support body or the member on which the speaker unit is mounted indicates a degree of easiness of vibration in the vibration body based on driving of the speaker unit, and
the degree of easiness of vibration at an area on which the vibration damping member is mounted in the support body is lower than the degree of easiness of vibration at an area on which the vibration damping member is mounted in the member on which the speaker unit is mounted.

4. The acoustic device according to claim 1,
wherein the vibration damping member is a bar-shaped member, a first end of which is fixed to the member on which the speaker is mounted, and a second end of which is fixed to the support body.

5. The acoustic device according to claim 1,
further comprising a plurality of vibration damping members provided at the speaker unit or the member on which the speaker unit is mounted.

6. The acoustic device according to claim 1,
wherein the support body has higher rigidity than the member on which the speaker unit is mounted.

7. The acoustic device according to claim 1, wherein
the vibration damping member includes a first member, a second member, and a third member,
the first member and the second member are connected to each other through the third member, and
the third member has a lower elastic modulus than the first member and the second member.

8. The acoustic device according to claim 7, wherein the third member is shear-deformed by a force applied through the first member and the second member.

9. The acoustic device according to claim 1,
wherein the support body is a member provided inside a vehicle.

10. The acoustic device according to claim 1,
wherein the member on which the speaker unit is mounted is a rear tray.

11. The acoustic device according to claim 1, wherein
the member on which the speaker unit is mounted includes a first surface with which the flange of the speaker unit is in contact and a second surface which is a back side of the first surface, and
the support body includes a first attached portion and a second attached portion each extending in a first direction and respectively attached to the second surface of the member on which the speaker unit is mounted at positions where the speaker unit is interposed between the first attached portion and the second attached portion in a second direction orthogonal to the first direction.

12. The acoustic device according to claim 11, wherein the first attached portion and the second attached portion of the support body are respectively attached to the second surface of the member on which the speaker unit is mounted such that the first attached portion and the second attached portion do not overlap the flange when viewed from the sound emitting direction of the speaker unit.

13. The acoustic device according to claim 1, wherein
the member on which the speaker unit is mounted includes a first surface with which the flange of the speaker unit is in contact and a second surface which is a back side of the first surface, and
the vibration damping member is disposed between the second surface of the member on which the speaker unit is mounted and the support body.

14. The acoustic device according to claim 13, wherein the vibration damping member is in contact with the second surface of the member on which the speaker unit is mounted.

* * * * *